(12) United States Patent
Nagata et al.

(10) Patent No.: US 9,539,651 B2
(45) Date of Patent: Jan. 10, 2017

(54) METHOD FOR MACHINING CENTER HOLES OF FORGED ROTARY BODY AND SYSTEM FOR MACHINING CENTER HOLES OF FORGED ROTARY BODY

(71) Applicant: MAZDA MOTOR CORPORATION, Hiroshima (JP)

(72) Inventors: Ryouhei Nagata, Aki-gun (JP); Shinsuke Komatsu, Hiroshima (JP); Kunihiko Iehisa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 118 days.

(21) Appl. No.: 14/430,189

(22) PCT Filed: Dec. 10, 2013

(86) PCT No.: PCT/JP2013/007243
§ 371 (c)(1),
(2) Date: Mar. 20, 2015

(87) PCT Pub. No.: WO2014/091742
PCT Pub. Date: Jun. 19, 2014

(65) Prior Publication Data
US 2015/0231710 A1    Aug. 20, 2015

(30) Foreign Application Priority Data
Dec. 12, 2012 (JP) ................. 2012-271628

(51) Int. Cl.
B23B 49/04 (2006.01)
B21J 5/00 (2006.01)
B21K 1/08 (2006.01)

(52) U.S. Cl.
CPC ............. *B23B 49/04* (2013.01); *B21J 5/00* (2013.01); *B21K 1/08* (2013.01); *B23B 2215/20* (2013.01); *Y10T 408/03* (2015.01); *Y10T 408/05* (2015.01)

(58) Field of Classification Search
CPC .............. B23B 49/04; B21J 5/00; B23Q 17/22
(Continued)

(56) References Cited

U.S. PATENT DOCUMENTS

| 5,408,745 A | 4/1995 | Tomiyama et al. |
| 5,713,253 A * | 2/1998 | Date ................ G05B 19/184 409/131 |

(Continued)

FOREIGN PATENT DOCUMENTS

| JP | S61-086628 A | 5/1986 |
| JP | H05-172682 A | 7/1993 |

(Continued)

OTHER PUBLICATIONS

International Search Report; PCT/JP2013/007243; Feb. 10, 2014.

*Primary Examiner* — G. Bradley Bennett
(74) *Attorney, Agent, or Firm* — Studebaker & Brackett PC

(57) ABSTRACT

Disclosed is a technique of achieving weight reduction of a forged rotary body while improving productivity of the forged rotary body. Temporary center holes are set for each of two or more samples extracted from one forging lot of a plurality of forged rotary bodies produced within a time period after a die misalignment adjustment through before a next die misalignment adjustment. Then, a virtual final shape of each of the samples is simulated on an assumption that machining is performed on the basis of the temporary center holes, and a rotational imbalance amount is calculated. Then, an average value of the rotational imbalance amounts in all of the samples in the same forging lot is calculated, and center-hole positions which allow the average value to become zero are set as center hole machining (Continued)

positions for all of the forged rotary bodies in a corresponding forging lot.

7 Claims, 8 Drawing Sheets

(58) Field of Classification Search
USPC .................................. 33/626, 628, 638, 644
See application file for complete search history.

(56) References Cited

U.S. PATENT DOCUMENTS

| | | | |
|---|---|---|---|
| 8,424,426 B2* | 4/2013 | Kume | ..................... B23B 41/04 |
| | | | 408/1 R |
| 2004/0093753 A1* | 5/2004 | McInroy | ................ G01D 11/30 |
| | | | 33/613 |
| 2008/0148588 A1* | 6/2008 | Yoshizumi | ............. G01B 5/012 |
| | | | 33/561 |
| 2010/0179675 A1 | 7/2010 | Yoshimoto | |
| 2013/0047451 A1* | 2/2013 | Koumoto | ............. G01B 21/042 |
| | | | 33/501.7 |
| 2013/0287511 A1* | 10/2013 | Yoshimoto | ............. B23B 49/04 |
| | | | 408/109 |
| 2015/0306681 A1* | 10/2015 | Yoshimoto | ............. B23B 49/04 |
| | | | 408/1 R |

FOREIGN PATENT DOCUMENTS

| | | |
|---|---|---|
| JP | H06-031542 A | 2/1994 |
| JP | 2007-264746 A | 10/2007 |
| JP | 4791577 B2 | 7/2011 |
| WO | 2009/016988 A1 | 2/2009 |

\* cited by examiner

METHOD FOR MACHINING CENTER HOLES OF FORGED ROTARY BODY AND SYSTEM FOR MACHINING CENTER HOLES OF FORGED ROTARY BODY

TECHNICAL FIELD

The present invention relates to a method for machining center holes of a forged rotary body and a system for machining center holes of a forged rotary body.

BACKGROUND ART

Generally, a rotary body to be rotated at high speeds, such as a crankshaft of an engine, is required to be accurately balanced about an axis thereof, in order to suppress vibration during rotation, etc. In this situation, if positional accuracy of center holes for use during machining the rotary body is poor, a rotational imbalance amount in the rotary body becomes larger. Therefore, it is necessary to adequately set positions of the center holes.

As a technique for setting the center-hole positions, the following Patent Document 1 discloses the following method. In the method disclosed in the Patent Document 1, first of all, a three-dimensional shape of a forged rotary body in a blank (pre-machining) state. Based on the resulting measurement values, temporary center holes are set up. Through simulation of machining on the basis of the temporary center holes, a virtual shape of the rotary body in a post-machining state is calculated. A rotational imbalance amount in the virtual shape is calculated. Then, when the calculated rotational imbalance amount falls within a correctable range, the temporary center holes are set as center holes for use during actual machining.

LIST OF PRIOR ART DOCUMENTS

Patent Documents

Parent Document 1: JP 4791577B

SUMMARY OF THE INVENTION

Technical Problem

In the method disclosed in the Parent Document 1, the three-dimensional shape measurement and the simulation are performed for all rotary bodies. Therefore, productivity is poor. Moreover, conventionally, a lot is renewed only when a die assembly is replaced, and a rotational imbalance amount is adjusted on a lot-by-lot basis. Therefore, due to an increase in the number of rotary bodies included in one lot, a variation range of the rotational imbalance amounts becomes larger, so that an adjustment margin for adjusting the rotational imbalance amount has to be largely set in advance. This undesirably increases a mass of the forged rotary body.

Therefore, the present invention is directed to providing a forged-rotary-body center hole machining method and a forged-rotary-body center hole machining system each capable of achieving weight reduction of a forged rotary body.

Solution to the Technical Problem

In order to solve the above technical problem, the present invention provides a method for machining center holes in a forged rotary body produced using a forging die assembly. The method comprises: a lot setup step of setting up, as a same one of a sequence of forging lots, a plurality of the forged rotary bodies which are forged within a time period after a die misalignment adjustment for the forging die assembly through before a next die misalignment adjustment for the forging die assembly; a three-dimensional shape measurement step of extracting, as samples, two or more of the forged rotary bodies from each of the forging lots, and measuring a three-dimensional shape of each of the samples to acquire measured three-dimensional shape data which is a result of the measurement; a temporary-center-hole position setting step of, based on the measured three-dimensional shape data, setting positions of temporary center holes for each of the samples; an imbalance amount calculation step of, based on the measured three-dimensional shape data about each of the samples and design three-dimensional shape data about a pre-set design final shape of the forged rotary body, calculating a rotational imbalance amount in a final shape of each of the samples after being subjected to simulation of given machining on the basis of the temporary center holes; a determination step of determining whether or not the rotational imbalance amount in each of the samples falls within a pre-set allowable range; an average value calculation step of, for any one of the forging lots in which the rotational imbalance amounts in all of the samples are determined to be within the allowable range, calculating an average value of the rotational imbalance amounts in all of the samples of the forging lot; a center hole machining position setting step of calculating center-hole positions which allow the average value of the rotational imbalance amounts to become zero, and setting the calculated center-hole positions as center hole machining positions for all of the forged rotary bodies included in the forging lot to which the samples used in the calculation belong; and a center hole machining step of, during machining of a certain forged rotary body, machining center holes in the certain forged rotary body at the center hole machining positions set for one of the forging lots to which the certain forged rotary body belongs.

The present invention also provides a system for machining center holes in a forged rotary body produced using a forging die assembly. The system comprises: a three-dimensional shape measurement device configured to extract, as samples, two or more of a plurality of the forged rotary bodies which are forged within a time period after a die misalignment adjustment for the forging die assembly through before a next die misalignment adjustment for the forging die assembly and set up as a same one of a sequence of forging lots, and measure a three-dimensional shape of each of the samples to acquire measured three-dimensional shape data which is a result of the measurement; a temporary-center-hole position setting device configured to, based on the measured three-dimensional shape data, set positions of temporary center holes for each of the samples; an imbalance amount calculation device configured to, based on the measured three-dimensional shape data about each of the samples and design three-dimensional shape data about a pre-set design final shape of the forged rotary body, calculate a rotational imbalance amount in a final shape of each of the samples after being subjected to simulation of given machining on the basis of the temporary center holes; a determination device configured to determine whether or not the rotational imbalance amount in each of the samples falls within a pre-set allowable range; an average value calculation device configured to, for any one of the forging lots in which the rotational imbalance amounts in all of the samples are determined to be within the allowable range, calculate an average value of the rotational imbalance amounts in all of the samples of the forging lot; a center hole machining position setting device configured to calculate center-hole positions which allow the average value of the rotational imbalance amounts to become zero, and set the calculated center-hole positions as center hole machining positions for all of the forged rotary bodies included in the forging lot to which the samples used in the calculation belong; and a center hole machining device configured to, during machining of a certain forged rotary body, machining center holes in the certain forged rotary body at the center hole machining positions set for one of the forging lots to which the certain forged rotary body belongs.

The term "rotational imbalance amount" here includes not only an absolute value of a magnitude of rotational imbalance in each sample but also information about a phase of rotational imbalance in each sample. Therefore, the determination on whether or not the rotational imbalance amount falls within the allowable range is not performed by determining whether only an absolute value of a rotational imbalance amount in each sample falls within an allowable range, but is performed while additionally taking into account a phase of rotational imbalance in each sample.

Similarly, the calculation of an average value of the rotational imbalance amounts is not performed by calculating an average of only absolute values of the rotational imbalance amounts in all of the samples, but is performed while additionally taking into account phases of rotational imbalances in all of the samples. That is, considering that a rotational imbalance amount is a vector extending from a center to a position of rotational imbalance, in a polar coordinate system (a length (radius) from the center to the position corresponds to a magnitude of the rotational imbalance, and a direction of the vector corresponds to a phase of the rotational imbalance), vectors representing respective rotational imbalance amounts in all of the samples are synthesized, and a value calculated by dividing a magnitude of the synthesized vector by the number of the samples is set as the average value.

In the present invention, instead of subjecting all of the rotary bodies included in one lot to the three-dimensional shape measurement and the simulation, only two or more samples extracted from one lot are subjected to the three-dimensional shape measurement and the simulation. Therefore, it is possible to improve productivity. In addition, every time the die misalignment adjustment is performed, a lot is newly set up, and center hole machining positions for this lot are set. Therefore, it is possible to keep the member of the rotary bodies in one lot, in a relatively small value, and keep variation in rotational imbalance amount in one lot, in a relatively small range. Thus, it is possible to reduce an adjustment margin which must be preliminarily provided in each of the forged rotary bodies so as to allow corrective machining for rotational imbalance, thereby achieving weight reduction of the forged rotary body.

Preferably, the forged-rotary-body center hole machining method further comprises a center hole machining position storing step of, after the center hole machining position setting step and before the center hole machining step, storing the center hole machining positions set in the center hole machining position setting step, in a storage device in association with identification information of each of the forging lots, wherein the center hole machining step includes, based on the identification information of the forging lot to which the certain forged rotary body belongs, reading the center hole machining positions for the certain forged rotary body from the storage device.

Preferably, the forged-rotary-body center hole machining system further comprises a storage device configured to store therein the center hole machining positions set by the center hole machining position setting device, in association with identification information of each of the forging lots, wherein the center hole machining device is operable, based on the identification information of the forging lot to which the certain forged rotary body belongs, to read the center hole machining positions for the certain forged rotary body from the storage device.

According to this feature, the center hole machining positions set for a respective one of the forging lots is read from the storage device, so that it is possible to automate a center hole machining process.

Preferably, in the forged-rotary-body center hole machining method and the forged-rotary-body center hole machining system, each of the forged rotary bodies is a crankshaft of an engine.

According to this feature, even in the case where each of the forged rotary bodies is a crankshaft of an engine, it is possible to obtain the above advantageous effects.

Preferably, the lot setup step includes, when the forging die assembly is replaced, setting up a forging lot of the forged rotary bodies produced after the replacement, as a different forging lot from that of the forged rotary bodies produced before the replacement.

According to this feature, a lot is renewed in conjunction with a die replacement, in addition to the die misalignment adjustment, and only forged rotary bodies produced under the same conditions are set up as the same lot. Thus, it is possible to further reduce the rotational imbalance amount in each of the rotary bodies in one lot. This allows the adjustment margin which must be preliminarily provided in each of the forged rotary bodies to be further reduced, thereby achieving weight reduction of the forged rotary body.

DESCRIPTION OF EMBODIMENTS

A forged-rotary-body center hole machining system according to one embodiment of the present invention and a forged-rotary-body center hole machining method according to one embodiment of the present invention will now be described.

Figure 1:
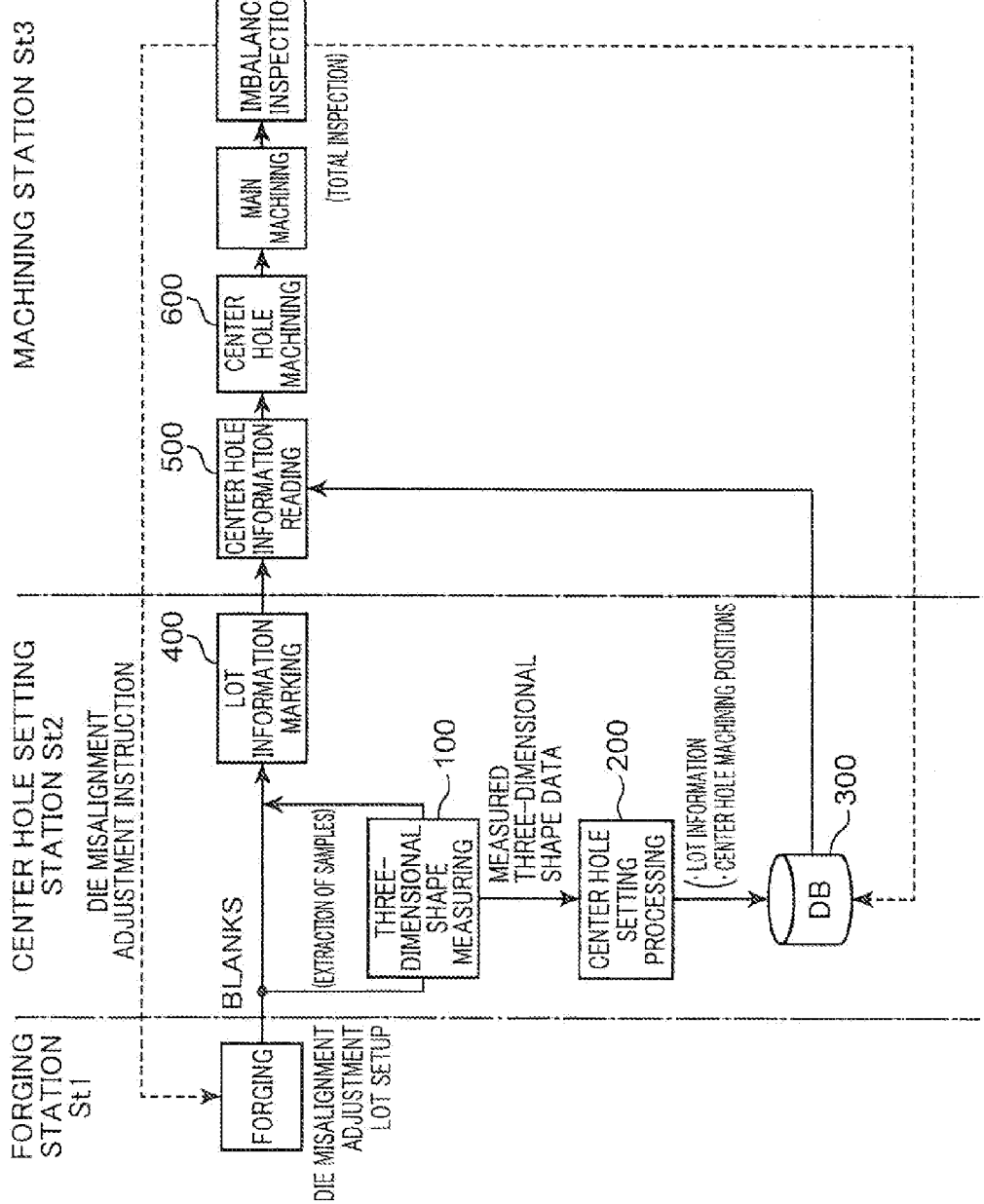
FIG. 1 is a block diagram illustrating a forged-rotary-body production system employing a center hole machining system according to one embodiment of the present invention.

FIG. 1 is a block diagram illustrating a forged-rotary-body production system employing the machining system according to this embodiment.

Figure 5:
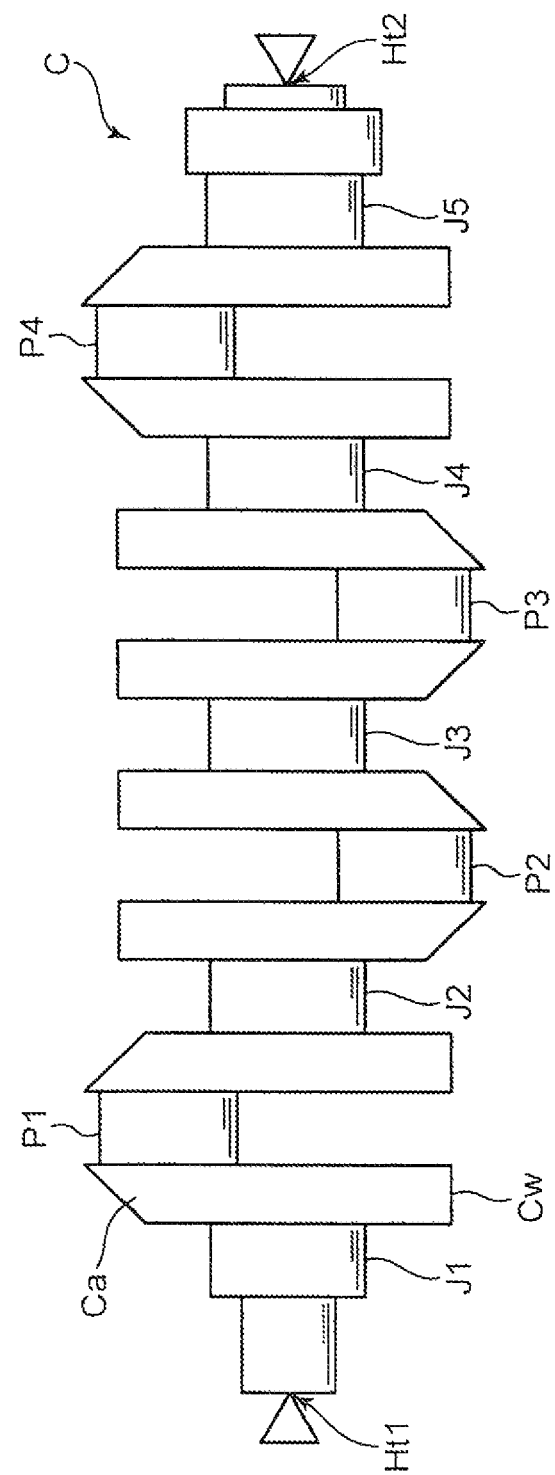
FIG. 5 is a schematic side view of a crankshaft, for explaining a three-dimensional shape measurement step and a temporary-center-hole position setting step in the center hole machining method in FIG. 1.

In this embodiment, as a forged rotary body, a crankshaft C of a four-cylinder engine as illustrated in FIG. 5 is produced. The production system comprises, along with a process sequence, a forging station St1, a center hole setting station St2 and a machining station St3.

First of all, an outline of the production system will be described.

In the forging station St1, die forging is performed. In the forging station St1, a forging die assembly consisting of a pair of upper and lower forging dies (the forging die assembly will hereinafter be referred to occasionally and simply as "die assembly") is set up. The die assembly is configured to compress a forging material to transfer a die shape to the forging material. In the forging station St1, through the die forging, a crankshaft C in a pre-machining state, i.e., a blank state, is forged. This crankshaft C in a blank state will hereinafter be referred to as "crankshaft (C) blank" on a case-by-case basis.

A relative position between the upper and lower dies can be misaligned with each other. That is, a so-called die misalignment is likely to occur. When the die misalignment occurs, a shape of the forged crankshaft C will deviate from a desired design shape. This gives rise to rotational imbalance in the crankshaft C. In the forging station St1, the die misalignment is adjusted so as to suppress the rotational imbalance. The die misalignment is performed, for example, when a control-parameter characteristic value of a crankshaft (C) blank goes beyond a threshold limit value, as described later.

A plurality of crankshaft (C) blanks produced until before a new die misalignment adjustment in the forging station St1 are setup as a same one of a sequence of forging lots (the forging lot will hereinafter be referred to simply as "lot"). That is, a plurality of crankshaft (C) blanks which are produced within a time period after a die misalignment adjustment through before a next die misalignment adjustment are set up as the same lot. In this embodiment, a lot is also changed when a die replacement is performed.

The center hole setting station St2 is provided with a three-dimensional shape measuring unit 100, a center hole setting processing unit 200, a database (storage device) 300, and a lot information marking unit 400. In FIG. 1, the word "unit" is abbreviated.

In the center hole setting station St2, among the crankshaft (C) blanks conveyed from the forging station St1, two or more samples Sp are extracted from each lot L. The three-dimensional shape measuring unit 100 is configured to measure a three-dimensional shape of each of the samples Sp. Resulting three-dimensional shape data for each of the samples Sp is sent to the center hole setting processing unit 200. The center hole setting processing unit 200 is configured to set center hole machining positions for the crankshaft C. The database 300 is configured to store therein the center hole machining positions in association with lot information. The lot information comprises a type name of the crankshaft C, and information identifying each lot.

After completion of the three-dimensional shape measurement, the samples Sp are returned to its original lot L. The lot information marking unit 400 is configured to mark the lot information in each of the crankshaft (C) blanks of each lot. The marked crankshaft (C) blanks are transported to the machining station St3.

The machining station St3 is provided with a center hole information reading unit 500, and a center hole machining unit (center hole machining device) 600. The center hole information reading unit 500 is configured to read the lot information from each of the crankshaft (C) blanks. The center hole information reading unit 500 is also configured to read, from the database 300, the center hole machining positions set for one of the lots which is identified by the identification information included in the read lot information. The center hole machining unit 600 is configured to machine center holes H, respectively, in axially opposite edge faces of each of the crankshaft (C) blanks, at the center hole machining positions read from the database 300.

In the machining station St3, after completion of the machining of the center holes H, the crankshaft (C) blank is subjected to a main machining step, an imbalance inspection step, an imbalance corrective machining step, and a finishing step, in this order.

In FIG. 1, regarding the center hole information reading unit 500 and the center hole machining unit 600, the word "unit" is abbreviated.

In the main machining step, the crankshaft (C) blank is sequentially subjected to profile cutting, boring, and grinding after heat treatment, using a machine tool. Specifically, first of all, the machine tool operates to cut each of first to fifth journal portions (J1 to J5) of the crankshaft (C) blank on the basis of the center holes H in such a manner as to allow an outer diameter of the journal portion to become equal to a given value. Then, the machine tool operates to make holes in the crankshaft C to thereby form a lubrication oil flow passage and others. Then, the crankshaft C is subjected to heat treatment. Then, the machine tool operates to grind a region of the heat-treated crankshaft C requiring a highly-accurate surface profile.

In the imbalance inspection step, imbalance of the crankshaft C during rotation, so-called "dynamic balance", is inspected using a balance measuring unit. This inspection is performed for all of the crankshafts C after completion of the main machining step. A result of the inspection is sent to the database 300 and stored in the database 300. According to need, the inspection result is also sent to the forging station St1. In the forging station St1, a die misalignment adjustment is performed based on the inspection result, according to need.

In the imbalance corrective machining step, based on the inspection result in the imbalance inspection step, the rotational imbalance in the crankshaft C is adjusted. Specifically, based on the inspection result, a hole is drilled in an outer periphery of an aftermentioned counterweight portion (Cw) of the crankshaft C.

In the finishing step, the crankshaft C is partially subjected to finishing, such as polishing and marking. After completion of the finishing, the crankshaft C is subjected to washing or cleaning.

Figure 2:
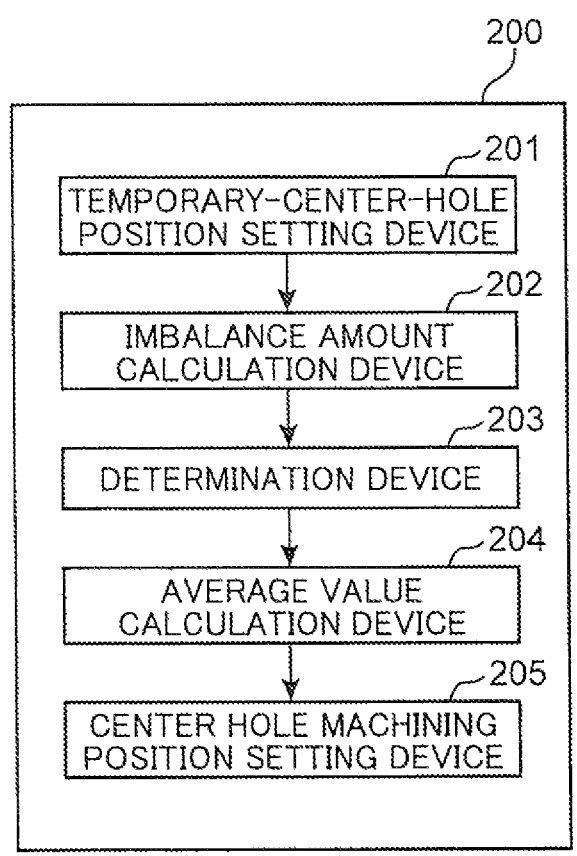
FIG. 2 is a block diagram for explaining a center hole setting processing unit in FIG. 1.

With reference to FIG. 2, the center hole setting processing unit 200 will be described in detail.

The center hole setting processing unit 200 comprises a temporary-center-hole position setting device 201, an imbalance amount calculation device 202, a determination device 203, an average value calculation device 204, and a center hole machining position setting device 205.

The temporary-center-hole position setting device 201 is configured to, based on the measured three-dimensional shape data measured for each of the samples Sp of the crankshaft (C) blanks C of each lot L by the three-dimensional shape measuring unit 100, set positions of temporary center holes Ht for each of the samples Sp;

The imbalance amount calculation device 202 is configured to simulate a virtual final shape of each of the samples Sp on an assumption that the main machining is performed on the basis of the set temporary center holes Ht. The imbalance amount calculation device 202 is also configured to calculate a rotational imbalance amount in the virtual final shape of each of the samples Sp. The imbalance amount calculation device 202 is configured to perform the above calculation, based on the measured three-dimensional shape data about each of the samples Sp and design three-dimensional shape data about a pre-set design final shape of the crankshaft C.

The determination device 203 is configured to determine whether or not the rotational imbalance amount in each of the samples Sp, calculated by the imbalance amount calculation device 202, falls within a range which is correctable in the imbalance corrective machining step.

The average value calculation device 204 is configured to, when the determination device 203 determines that the rotational imbalance amounts in all of the samples Sp of the lot L fall within the correctable range, calculate an average value of the rotational imbalance amounts in all of the samples SP of the lot L.

The center hole machining position setting device 205 is configured to calculate center-hole positions H which allow the average value of the rotational imbalance amounts calculated by the average value calculation device 204 to become zero. The center hole machining position setting device 205 is also configured to set the calculated center-hole positions H as center hole machining positions for all of the crankshafts C each belonging to the lot L.

Figure 3:
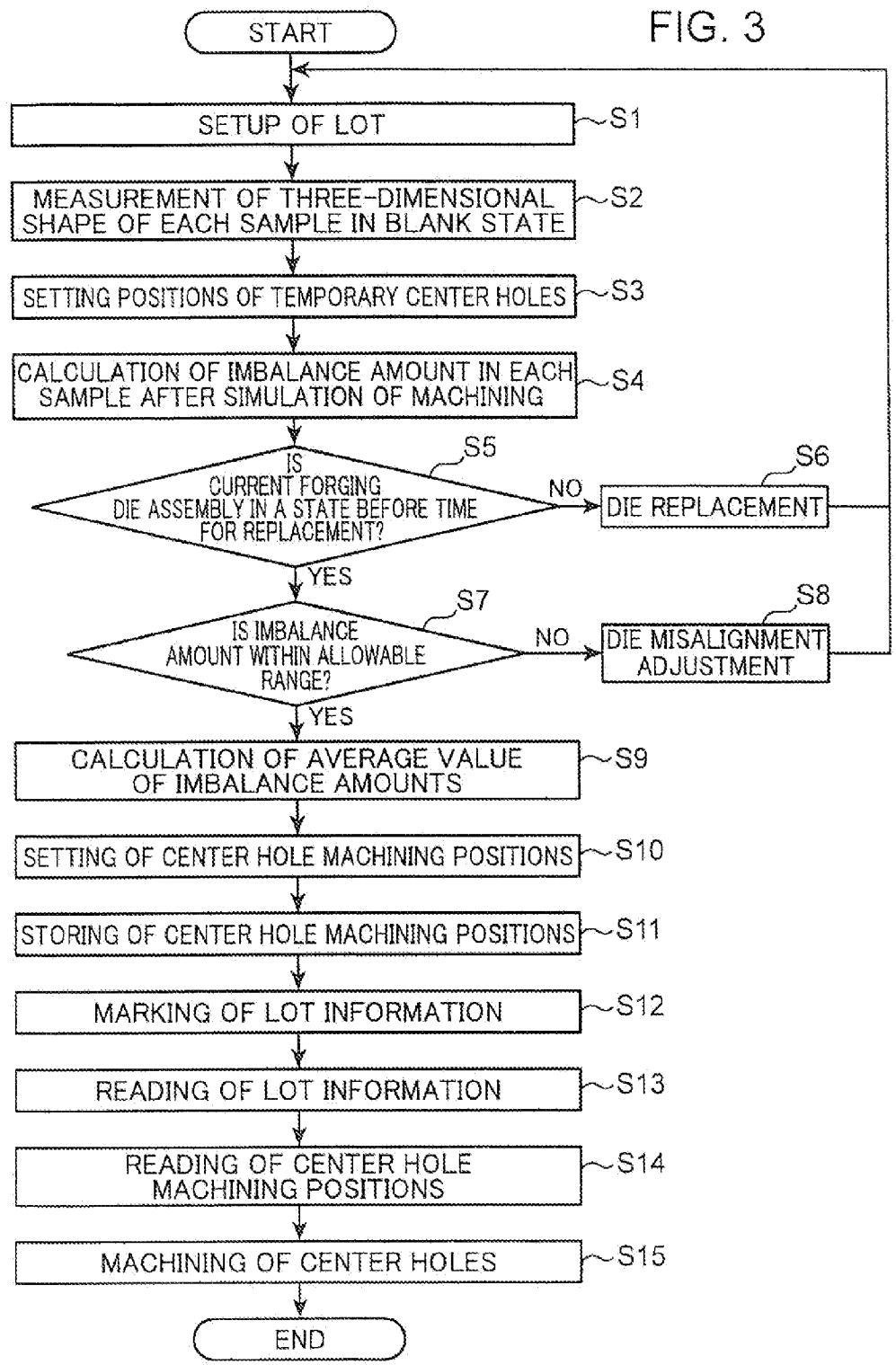
FIG. 3 is a flow chart for explaining the center hole machining method in FIG. 1.

Next, with reference to FIG. 3, steps until center holes are machined by the center hole machining unit 600, i.e., a method for machining the center holes H, will be described.

In Step S1, until before a die misalignment adjustment is newly performed, and until before a die replacement is newly performed, a plurality of forged crankshaft (C) blanks are set up as a common lot L (lot setup step).

In Step S2, two or more samples Sp are extracted from the crankshaft (C) blanks in the same lot L. Further, a three-dimensional shape of each of the samples Sp is measured by the three-dimensional shape measuring unit 100 (three-dimensional shape measurement step).

In this embodiment, the three-dimensional shape measuring unit 100 is a contact-type measuring unit. That is, the three-dimensional shape measuring unit 100 is configured to measure a three-dimensional position of each of a plurality of measurement points set on a surface of the sample Sp to be measured, while bringing a plurality of probes thereof into contact with the respective measurement points. Alternatively, as the three-dimensional shape measuring unit, a non-contact type measuring unit using laser or infrared light may be used.

Specifically, for setting positions of temporary center holes Ht, positions of four points located on an outer peripheral surface of the first journal portion (J1) of the crankshaft (C) blank, and spaced apart from each other by 90 degrees on a circumference intersecting with a pre-set profile thereof, and positions of four points located on an outer peripheral surface of the fifth journal portion (J5) of the crankshaft (C) blank and spaced apart from each other by 90 degrees on a circumference intersecting with a pre-set profile thereof, are measured.

Further, for setting a reference position of a phase about the temporary center holes Ht, positions of four points located on an outer peripheral surface of a first pin portion (P1) and spaced apart from each other by 90 degrees on a circumference intersecting with a pre-set profile thereof are measured.

Additionally, for calculating a rotational imbalance amount in the crank shaft C, a plurality of points on an outer periphery of a counterweight portion (Cw) integral with a crank arm portion (Ca) are measured. The counterweight portion (Cw) is substantially not subjected to machining, and thereby rotational imbalance during the forging remains therein.

In Step S3, based on the measured three-dimensional shape data obtained for each of the samples Sp in the Step S2, positions of temporary center holes Ht for each of the samples Sp are set (temporary-center-hole position setting step).

Specifically, first of all, a center position of a circle passing through the four points on the outer peripheral surface of each of the first journal portion (J1) and the fifth journal portion (J5) is calculated on a per-journal basis. Then, an axis passing through the calculated two center positions is calculated as a temporary central axis. Then, two intersection points between the temporary central axis and respective axially opposite edge faces in each of the samples Sp are calculated. The calculated intersection points are set as positions of temporary center holes Ht1, Ht2.

Further, in the Step S3, a center position of a circle passing through the four points on the outer peripheral surface of the first pin portion (P1) is calculated. Then, a direction of a straight line intersecting with the temporary central axis at a right angle and passing through the center position is set as a reference phase (e.g., 0 degree) of the rotational imbalance in each of the samples Sp.

In Step S4, with respect to each of the samples Sp, a rotational imbalance amount after the main machining is virtually calculated (imbalance amount calculation step).

Specifically, a final shape to be obtained after each of the samples Sp is subjected to the main machining on the basis of the temporary center holes Ht is simulated based on the measured three-dimensional shape data for each of the samples Sp. Then, a virtual final shape (virtual three-dimensional shape data) obtained by the simulation and a design final shape (design three-dimensional shape data) of the crankshaft C are compared with each other to calculate a difference in shape (including a magnitude and direction of a deviation) therebetween. Further, based on the calculated difference in shape, a rotational imbalance amount in each of the samples Sp is calculated. The rotational imbalance amount is a vector, i.e., a value having magnitude and direction. The design final shape (design three-dimensional shape data) of the crankshaft C is preliminarily stored in the database 300.

In Step S5, it is determined whether or not the die assembly has reached a time for replacement. When it is determined that the die assembly has not yet reached the time for replacement, the process will advance to Step S7. On the other hand, when it is determined that the die assembly has reached the time for replacement, a die replacement is performed in Step S6. In conjunction with the die replacement, the lot is renewed. That is, a plurality of crankshaft (C) blanks newly forged after the die replacement are set up as a new lot.

In Step S7, it is determined whether or not the rotational imbalance amount in each of the samples Sp falls within a pre-set allowable range (determination step). The allowable range is a range which is correctable in the imbalance corrective machining step. When the rotational imbalance amounts in all of the samples are determined to be within the allowable range, the process will advance to Step S9. On the other hand, when the rotational imbalance amount in is determined to be out of the allowable range, a die misalignment adjustment is performed in Step S8. In conjunction with the die misalignment adjustment, the lot is renewed, in the same manner as that during the die replacement. That is, a plurality of crankshaft (C) blanks newly forged after the die misalignment adjustment are set up as a new lot.

The determination in the Step S7 is performed while taking into account an absolute value of the rotational imbalance amount and a phase of the rotational imbalance in each of the samples Sp.

In Step S9, an average value of the rotational imbalance amounts in all of the samples Sp is calculated (average value calculation step).

Specifically, in a polar coordinate system, vectors representing the rotational imbalance amounts in all of the samples Sp each having a starting point at a coordinate center are synthesized. In this case, an absolute value of a magnitude of the rotational imbalance corresponds to a length from the coordinate center, and a phase of the rotational imbalance corresponds to a direction from the coordinate center. Then, a value calculated by dividing a magnitude of the synthesized vector by the number of the samples is set as an average value of the rotational imbalance amounts.

In Step S10, center-hole positions which allow the average value of the rotational imbalance amounts calculated in the Step S9 to become zero are calculated. The center-hole positions are set as center hole machining positions for all of the crankshafts C belonging to the lot L in which the samples Sp are included (center hole machining position setting step).

In Step S11, the center hole machining positions set in the Step S10 are stored in the database 300 in association with identification information of the lot L (center hole machining position storing step).

In Step S12, lot information comprising the identification information of the lot L and a type name of the crankshaft C is marked in all of the crankshaft (C) blanks by the lot information marking unit 400. In this embodiment, characters, such as numerals and/or alphabets, representing the lot information, are marked. As an alternative to characters, for example, a barcode, a two-dimensional code or the like may be marked.

In Step S13, for each of the crankshaft (C) blanks, the lot information is read from the marked content. Specifically, an image of a marked portion of each of the crankshaft (C) blanks is acquired by an image pick-up device, such as a CCD camera, provided in the machining station St3. Acquired image data is subjected to given image processing. Then, through heretofore-known pattern matching processing, marked characters are automatically recognized.

In the case where a barcode or a two-dimensional code is marked, it may be read using a dedicated code reader. Further, in the case where characters are marked, it may be visually read by an operator.

In Step S14, based on the lot information red in the Step S13, the center hole information reading unit 500 reads, from the database 300, the center hole machining positions for the lot L to which the crankshaft (C) blanks belong.

In the case where the lot information is visually read by an operator, the operator may input the lot information into the center hole information reading unit 500 by using an input device such as a keyboard.

In Step S15, the center hole machining unit 600 machines center holes H in each of the crankshaft (C) blanks at the respective center hole machining positions (machining step).

Through the above Steps S1 to S15, the center holes are machined in each of the crankshaft (C) blanks. Subsequently, the crankshaft (C) blanks having the center holes machined therein are transferred to the main machining step.

(Lot Setup Step)

The lot setup step in the Step S1 will be more specifically described.

As mentioned above, in this embodiment, when the rotational imbalance amount goes beyond the allowable range, a die misalignment adjustment is performed. The die misalignment adjustment is appropriately performed to allow a control-parameter characteristic value of the produced crankshaft (C) blank to fall within the pre-set allowable range, i.e., a range which is correctable by the imbalance corrective machining. In conjunction of the die misalignment adjustment, a lot for a plurality of crankshaft (C) blanks produced after the die misalignment adjustment is renewed. Further, as mentioned above, in this embodiment, in conjunction with a die replacement, a lot for a plurality of crankshaft (C) blanks produced after the die replacement is renewed. As above, in this embodiment, a plurality of crankshaft (C) blanks produced within a time period where the die assembly is neither adjusted nor replaced are set up as the same lot.

Details of the die misalignment adjustment based on the control-parameter characteristic value will be described using FIG. 4.

Figure 4:
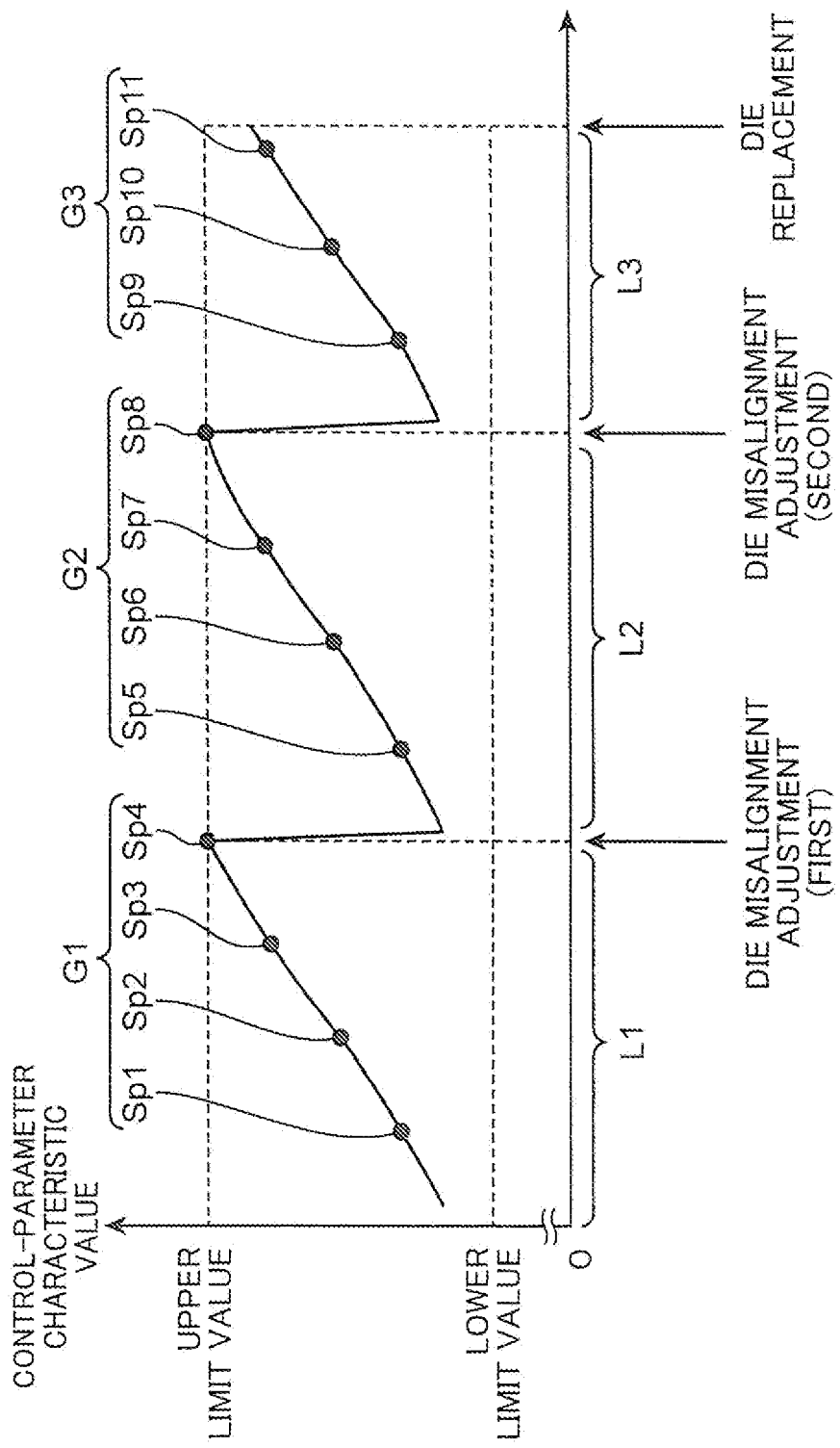
FIG. 4 is a graph for explaining a lot setup step in the center hole machining method in FIG. 1.

The horizontal axis in FIG. 4 represents a production flow of the crankshaft (C) blanks, wherein date of the production becomes more recent toward a right side of the horizontal axis. The vertical axis in FIG. 4 represents the control-parameter characteristic value of the produced crankshaft (C) blank. In the example illustrated in FIG. 4, the control-parameter characteristic value is a value which gradually increased along with an increase in die misalignment amount, such as a shaft warpage value of the crankshaft (C) blank, As illustrated in FIG. 4, the control-parameter characteristic value gradually increases along with an increase in the number of produced crankshaft (C) blanks. Thus, a misalignment between the upper and lower dies gradually increases along with an increase in the production volume.

Every time a given number of crankshaft (C) blanks is produced, a latest one of the crankshaft (C) blanks is extracted as a sample Sp. Further, the control-parameter characteristic value of the sample Sp comes close to an upper limit value, a die misalignment adjustment is performed.

In the example illustrated in FIG. 4, the control-parameter characteristic value of a sample Sp4 firstly reaches a value close to the upper limit value, so that a first die misalignment adjustment is performed just after production of the sample Sp4. Thus, a plurality of crankshaft (C) blanks produced until extraction of the sample Sp4 (including the sample Sp4) are set up as a common lot L1. As a result of the die misalignment adjustment, the control-parameter characteristic value of a crankshaft (C) blank just after the die misalignment adjustment becomes more adequate. In the example illustrated in FIG. 4, the control-parameter characteristic value of the sample Sp becomes sufficiently small. A plurality of crankshaft (C) blanks produced after the first die misalignment adjustment are set up as a new lot L2.

After the first die misalignment adjustment, the production of a crankshaft (C) blank will be further continued, so that a die misalignment amount will gradually increase again. In the example illustrated in FIG. 4, the control-parameter characteristic value of a sample Sp8 secondly reaches a value close to the upper limit value, so that a second die misalignment adjustment is performed just after production of the sample Sp8. Thus, a plurality of crankshaft (C) blanks produced after the sample SP4 through until extraction of the sample Sp8 are set up as the lot L2.

As above, in this embodiment, the die misalignment adjustment and the lot renewal are also performed depending on the control-parameter characteristic value.

As mentioned above, in this embodiment, the lot L is also renewed when the die assembly is renewed or replaced. In this embodiment, when a sum of crankshaft (C) blanks produced using a given die assembly reaches a pre-set maximum number, the die assembly is replaced with a new one. Therefore, in the example illustrated in FIG. 4, upon reaching a time for die replacement, a plurality of crankshaft (C) blanks produced within a time period just after the second die misalignment adjustment through until the die replacement are set up as the same lot L3, although the control-parameter characteristic value of a sample Sp11 is sufficiently small as compared to the upper limit value. Then, a plurality of crankshaft (C) blanks produced after the die replacement are set up as a new lot.

G1, G2 and G3 in FIG. 4 denote, respectively, a set of samples Sp1 to Sp4, a set of Sp5 to Sp8, and a set of Sp9 to Sp11, in the lots L1, L2, L3.

(Three-Dimensional Shape Measurement Step, Temporary-Center-Hole Position Setting Step)

With reference to FIG. 5, the three-dimensional shape measurement step and the temporary-center-hole position setting step in Steps S2 and S3 will be more specifically described.

FIG. 5 is a schematic side view of the crankshaft C in this embodiment.

As illustrated in FIG. 5, in this embodiment, the crankshaft C is a crankshaft installable in a four-cylinder engine. The crankshaft C primarily comprises crankpin portions (hereinafter referred to as "pin portions") P1 to P4, first to fifth crank journal portions (hereinafter referred to as "journal portions") J1 to J5, and a plurality of crank arm portions (hereinafter referred to as "arm portions") Ca, and a plurality of counterweight portions Cw each extending from a respective one of the arm portions Ca. Each of the pin portions P1 to P4 rotatably supports a respective one of four connecting rods (not illustrated) connected to respective pistons (not illustrated) corresponding to the four cylinders. Each of the journal portions J1 to J5 is rotatable about the same axis as that of the crankshaft C. The arm portions Ca couples between adjacent ones of the pin portions P1 to P4 and the journal portions J1 to J5.

The crankshaft C is formed, for example, using non-heat treated steel for hot forging, such as SMn 438.

As mentioned above, four points on an outer peripheral surface of each of the first and fifth journal portions J1, J5 in each sample Sp are measured by the three-dimensional shape measuring unit 100, and a center position of a circle passing through the four points is calculated for each of the first journal portions J1, J5. Then, two intersection points between an axis passing through the two center positions and respective opposite edge faces of the crankshaft C are set as temporary center holes Ht1, Ht2 for each sample Sp Further, as mentioned above, four points on an outer peripheral surface of the first pin portion P1 in each sample Sp are measured by the three-dimensional shape measuring unit 100, and a center position of a circle passing through the four points is calculated. Then, a direction of a line which is normal to a temporary central axis passing through the temporary center holes Ht1, Ht2, and connected to the center position, is set as a reference phase of rotational imbalance in each sample Sp.

(Die Misalignment Adjustment Step)

Figure 6:
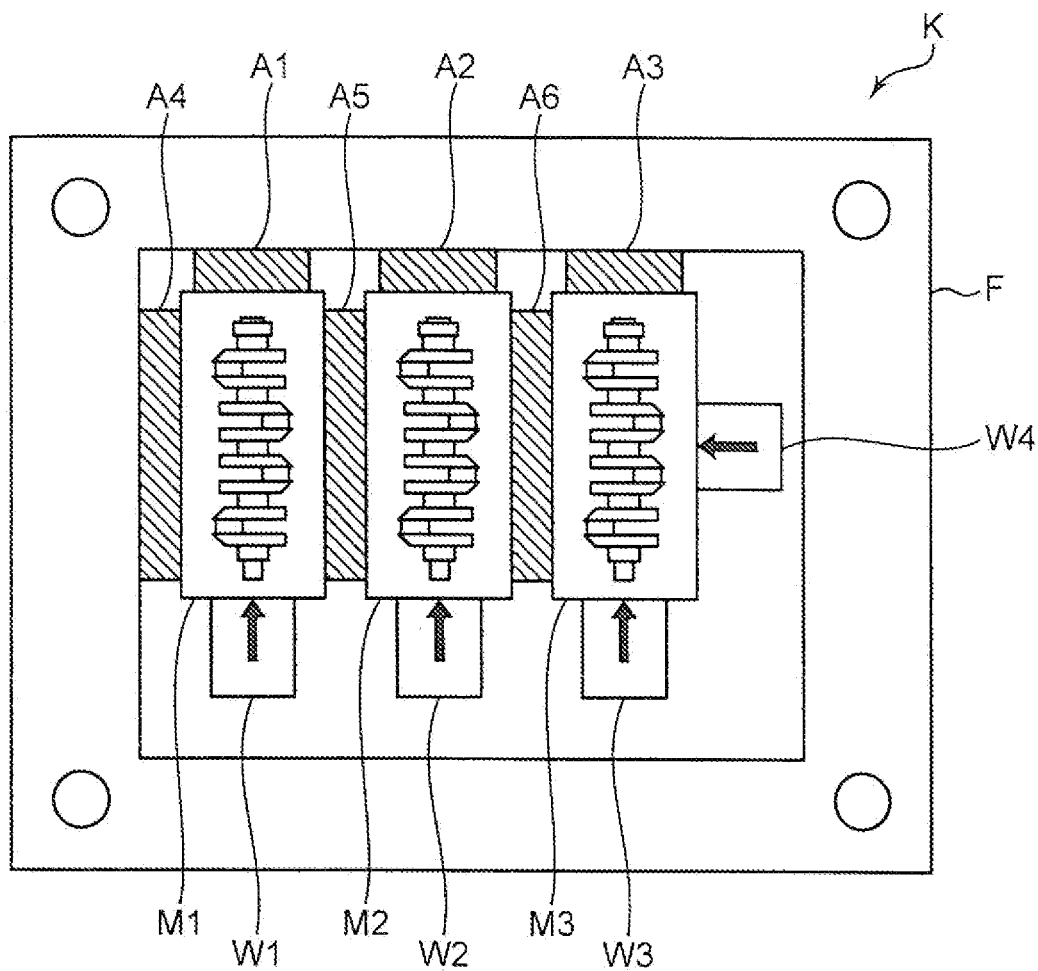
FIG. 6 is a schematic top plan view of a lower die of a forging die assembly, for explaining a die misalignment adjustment step in the center hole machining method in FIG. 1.

With reference to FIG. 6, the die misalignment adjustment step in the Step S8 will be more specifically described.

The forging die assembly in this embodiment is a so-called "triple fording die assembly" which comprises a pair of upper and lower dies, wherein each of the upper die and the lower die K includes three die elements arranged in order of process sequence. FIG. 6 is a schematic top plan view of the lower die K.

The lower die K is horizontally fixed with respect to the upper die, and primarily comprises a frame body F, three die elements M1 to M3, six adjustment members A1 to A6, and four pressing members W1 to W4. The frame body F is reciprocatingly movable in an upward-downward direction. Each of the die elements M1 to M3 and the adjustment members A1 to A6 is replaceable. The three die elements M1 to M3 makes up a triad arranged in order of process sequence. A rod-shaped forging material is input into the die elements M1, M2, M3 in this order, and shaped into crankshaft (C) blanks.

Each of the adjustment members A1 to A6 is a plate-shaped member having a given thickness. Each of the adjustment members A1 to A6 is appropriately selected from a plurality of types of preliminarily-prepared plate-shaped members having different plate thicknesses, and used. The pressing members W1 to W4 are capable of pressing the die elements M1 to M3 in respective arrowed directions in FIG. 6. Each of the pressing members W1 to W4 is composed of a pair of wedge-shaped members, and capable of pressing an associated one of the die elements M1 to M3 by an wedge effect.

The die element M1 is fixed while being pressed against an inner wall surface of the frame body F (upwardly, in FIG. 6) by the pressing member W1 through the adjustment member A1. Similarly, the die elements M2, M3 are fixed while being pressed against the inner wall surface of the frame body F (upwardly, in FIG. 6), respectively, by the pressing members W2, W3 through the adjustment members A2, A3.

The adjustment member A4 is clamped between the die element M1 and the inner wall surface of the frame body F. The adjustment member A5 is clamped between the die element M1 and the die element M2. The adjustment member A6 is clamped between the die element M2 and the die element M3. The die elements M1 to M3 and the adjustment members A4 to A6 are fixed while being collectively pressed against the inner wall surface of the frame body F (left-wardly, in FIG. 6) by the pressing means W4.

The die misalignment adjustment is performed by replacing some of the adjustment members A1 to A6 to ones each changed in terms of thickness. For example, in the case where only the die element M1 is displaced leftwardly from a proper position by a given value, the adjustment member A4 is replaced with one having a plate thickness increased by the given value, and the adjustment member A5 is replaced with one having a plate thickness reduced by the given value. This allows only the die element M1 to be adjusted to the proper position.

As above, the die elements M1 to M3 are adjusted to respective proper positions on a horizontal plane by replacing one or more the adjustment members A1 to A6. The die misalignment adjustment may be performed in such a manner that the upper die and the lower die K are formed into the same structure, and a position of the upper die is adjusted in addition to the lower die K. Alternatively, only the upper die may be adjusted.

(Imbalance Amount Calculation Step, Average Value Calculation Step, Center Hole Machining Position Setting Step)

With reference to FIG. 7 (FIG. 7A to 7D), imbalance amount calculation step to center hole machining position setting step in the Steps S4 to S10 will be more specifically described.

Figure 7B:
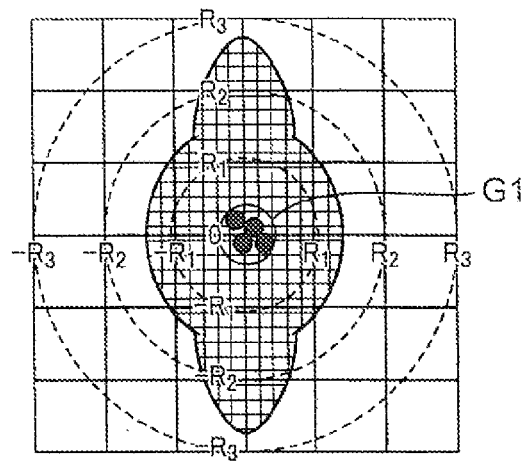
FIG. 7 illustrates steps from an imbalance amount calculation step to a center hole machining step in the center hole machining method in FIG. 1.
Figure 7A:
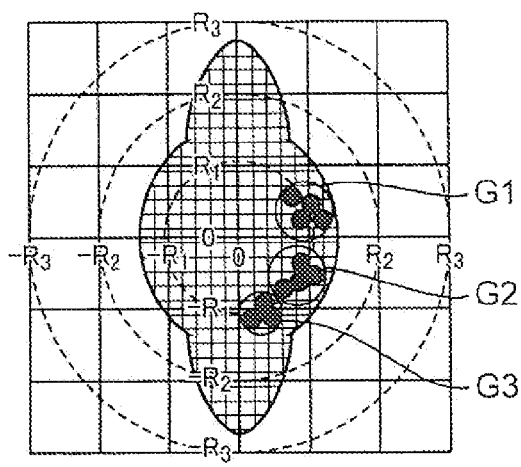
Figure 7C:
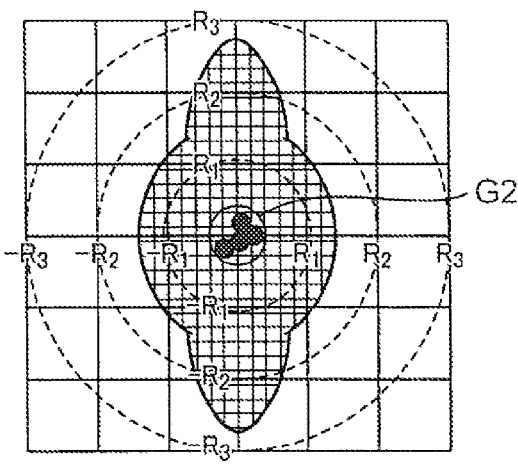
Figure 7D:
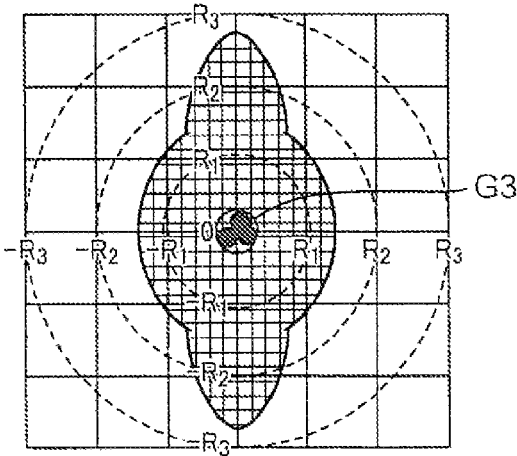
Figure 8A:
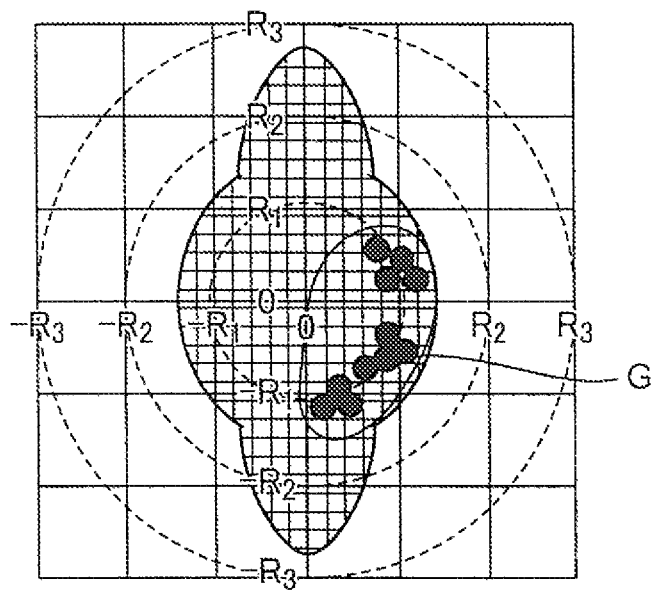
FIG. 8 illustrates, in comparison with FIG. 7, steps from the imbalance amount calculation step to the center hole machining step in the case where a time period until before a subsequent die replacement is defined as one forging lot.
Figure 8B:
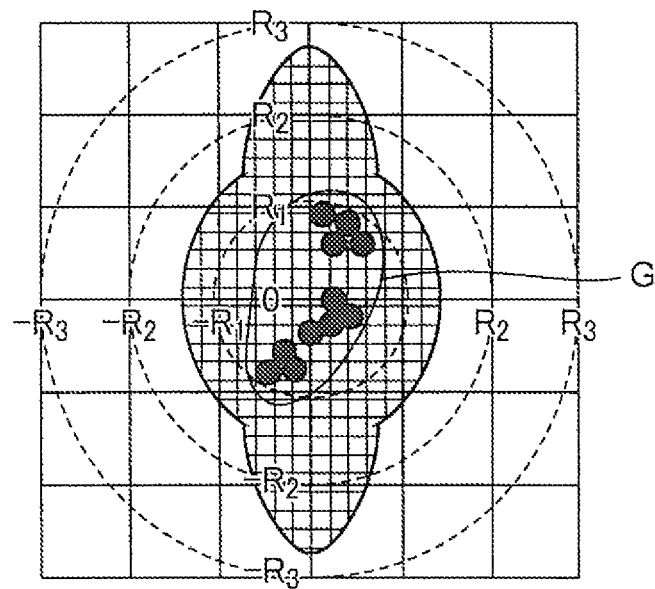

Each of FIGS. 7 and 8 (FIGS. 8A and 8B), presents respective rotational imbalance amounts in the samples Sp1 to Sp11 illustrated in FIG. 4, on a polar coordinate graph by black circles. In FIGS. 7 and 8, points of the samples Sp in the same lot L (sample sets G1 to G3) are circled.

In FIGS. 7 and 8, a radius of a dashed circle indicates a magnitude (unit: g·cm) of rotational imbalance, and a direction with respect to a center of the circle, i.e., a center of the each graph indicates a phase of rotational imbalance. Further, a shaded region indicates an allowable range of the rotational imbalance amount which is correctable by the imbalance corrective machining.

As mentioned above, based on measured three-dimensional shape data about each of the samples Sp1 to Sp11, a virtual final shape of each of the samples Sp1 to Sp11 to be obtained of on an assumption that the main machining is performed on the basis of the temporary center holes Ht is simulated.

As mentioned above, a difference between the virtual final shape of each of the samples Sp1 to Sp11 obtained through the simulation, i.e., virtual three-dimensional data, and a design final shape of the crankshaft C pre-stored in the database 300 (design three-dimensional data), are calculated. Then, based on the calculated difference in shape, a rotational imbalance amount in each of the samples Sp1 to Sp11 is calculated.

In FIG. 7A, the calculated rotational imbalance amounts in all of the samples Sp1 to Sp11 are presented. As illustrated in FIG. 7A, the rotational imbalance amounts in the sample sets G1 to G3 of the lots L1 to L3 are scattered.

With respect to each of the lots L1 to L3, it is determined whether or not the rotational imbalance amounts in the samples Sp fall within the allowable range. For example, in FIG. 7A, when the black circles in the sample set G1 falls within the shaded region, it is determined that the rotational imbalance amounts in the samples Sp fall within the allowable range.

Then, with respect to each of the lots L1 to L3, an average of the rotational imbalance amounts in the samples Sp are calculated.

This calculation will be more specifically described by taking the lot L1 as an example. First of all, in FIG. 7A, vectors extending from the center of the graph to respective black pints indicative of the rotational imbalance amounts in the samples Sp1 to Sp4 are synthesized. A magnitude of the synthesized vector is calculated. A value calculated by dividing the calculated magnitude of the synthesized vector by the number of the samples (in the lot L1, the number of the samples is four) is set as an average value of the rotational imbalance amounts in the samples Sp of the lot L1.

Then, a position which is located in the same direction as that of the synthesized vector and distant (from the center of the graph) by a distance corresponding to the above average value is set as an average value of the rotational imbalance amounts in the samples Sp of the lot L1, i.e., as an average value of the rotational imbalance amounts.

Then positions of the center holes H are corrected to allow the calculated average value of the rotational imbalance amounts to become zero, i.e., to be plotted at a coordinate center. Specifically, each of the temporary center holes Ht is positionally corrected such that it is displaced from its original position by the average value of the rotational imbalance amounts (average position of the rotational imbalance). Then, the corrected positions of the center holes H are set as center hole machining positions for each of a plurality of crankshaft (C) blanks belonging to a corresponding one of the lots L.

More specifically, in the lot L1, positions of the temporary center holes Ht are shifted to allow an average value of the rotational imbalance amounts (average position of the rotational imbalance) in the sample set G1 (sample Sp1 to Sp4) to move toward the coordinate center, as illustrated in FIG. 7B. The shifted positions of the temporary center holes Ht are set as center hole (H) machining positions for each of a plurality of crankshaft (C) blanks belonging to the lot L1.

Similarly, regarding the sample sets G2, G3 of the lot L2, L3, as illustrated in FIGS. 7C and 7D center hole (H) machining positions for each of a plurality of crankshaft (C) blanks belonging to each of the lots L2, L3 are set to allow an average position of the rotational imbalance to move toward a center of each of the graphs.

As above, in this embodiment, every time a die misalignment adjustment or a die replacement is performed, a lot is renewed, and machining positions for center holes H of a crankshaft H are set on a lot-by-lot basis.

Thus, it is possible to narrow a variation range of rotational imbalance amounts in a plurality of crankshaft (C) blanks in the same lot.

Specifically, supposing that the lot L is switched only if a die replacement is performed, in the example illustrated in FIG. 4, the samples Sp1 to Sp11 are set up as a sample set G of the same lot. Thus, rotational imbalance amounts in the sample set G of the lot L vary (is scattered) widely, as illustrated in FIG. 8A. Therefore, even if positions of the temporary center holes Ht are appropriately shifted to allow an average position of the rotational imbalances in the sample set G to move toward a coordinate center, the rotational imbalance amounts in the samples Sp1 to Sp11 still vary widely (within a radius of about R1 g·cm), as illustrated in FIG. 8B. A range of the rotational imbalance amounts illustrated in FIG. 8A is larger than a range of a region of rotational imbalance amounts illustrated in each of FIGS. 7B to 7D. As above, in this embodiment where, every die misalignment adjustment, a lot is renewed, and center holes are set on a lot-by-lot basis, a variation range of the rotational imbalance amounts is narrowed as compared to the case where a lot is renewed every die replacement.

In addition, in this embodiment, the center hole machining positions are newly set every die misalignment adjustment (on a lot-by-lot basis), so that a variation range of imbalance amount in a plurality of crankshafts C in each lot L is narrowed. Thus, it is possible to reduce a size of the counterweight portions Cw as an adjustment margin preliminarily provided in the crankshaft C to perform imbalance corrective machining, thereby achieving weight reduction of the crankshaft C.

In this embodiment, only the samples Sp among the crankshafts C are subjected to the three-dimensional shape measurement and the simulation. Thus, it is possible to keep a time and effort for the operation at a low level, as compared to the case where all crankshaft (C) blanks are subjected to the three-dimensional shape measurement and the simulation. This improves productivity of the crankshaft C.

In this embodiment, the center hole machining positions are stored in a database DB in association with identification information of each lot L. Then, in the center hole machining step, based on the identification information of one of the lots L to which a crankshaft C to be subject to machining for center holes H belongs, the center hole machining positions set for the lot L are read from the database DB. Thus, it is possible to automate the center hole machining step.

Although the above embodiment has been described based on an example where a crankshaft C is employed as a forged rotary body, the present invention can be applied to a production system for any other rotary component to be produced by forging, in the addition to crankshaft C. Further, an applicable technical field is not limited to the technical field of production of a vehicle engine.

It is to be understood that the present invention is not limited to the exemplified embodiment, but various changes and modifications may be made therein without departing from the spirit and scope thereof as set forth in appended claims.

What is claimed is:

1. A method for machining center holes in a forged rotary body produced using a forging die assembly, comprising:
   a lot setup step of setting up, as a same one of a sequence of forging lots, a plurality of the forged rotary bodies which are forged within a time period after a die misalignment adjustment for the forging die assembly through before a next die misalignment adjustment for the forging die assembly;
   a three-dimensional shape measurement step of extracting, as samples, two or more of the forged rotary bodies from each of the forging lots, and measuring a three-dimensional shape of each of the samples to acquire measured three-dimensional shape data which is a result of the measurement;
   a temporary-center-hole position setting step of, based on the measured three-dimensional shape data, setting positions of temporary center holes for each of the samples;
   an imbalance amount calculation step of, based on the measured three-dimensional shape data about each of the samples and design three-dimensional shape data about a pre-set design final shape of the forged rotary body, calculating a rotational imbalance amount in a final shape of each of the samples after being subjected to simulation of given machining on the basis of the temporary center holes;
   a determination step of determining whether or not the rotational imbalance amount in each of the samples falls within a pre-set allowable range;
   an average value calculation step of, for any one of the forging lots in which the rotational imbalance amounts in all of the samples are determined to be within the allowable range, calculating an average value of the rotational imbalance amounts in all of the samples of the forging lot;
   a center hole machining position setting step of calculating center-hole positions which allow the average value of the rotational imbalance amounts to become zero, and setting the calculated center-hole positions as center hole machining positions for all of the forged rotary bodies included in the forging lot to which the samples used in the calculation belong; and
   a center hole machining step of, during machining of a certain forged rotary body, machining center holes in the certain forged rotary body at the center hole machining positions set for one of the forging lot to which the certain forged rotary body belongs.

2. The method as defined in claim 1, which further comprises a center hole machining position storing step of, after the center hole machining position setting step and before the center hole machining step, storing the center hole machining positions set in the center hole machining position setting step, in a storage device in association with identification information of each of the forging lots, wherein the center hole machining step includes, based on the identification information of the forging lot to which the certain forged rotary body belongs, reading the center hole machining positions for the certain forged rotary body from the storage device.

3. The method as defined in claim 1, wherein each of the forged rotary bodies is a crankshaft of an engine.

4. The method as defined in claim 1, wherein the lot setup step includes, when the forging die assembly is replaced, setting up a forging lot of the forged rotary bodies produced after the replacement, as a different forging lot from that of the forged rotary bodies produced before the replacement.

5. A system for machining center holes in a forged rotary body produced using a forging die assembly, comprising:
   a three-dimensional shape measurement device configured to extract, as samples, two or more of a plurality of the forged rotary bodies which are forged within a time period after a die misalignment adjustment for the forging die assembly through before a next die misalignment adjustment for the forging die assembly and set up as a same one of a sequence of forging lots, and measure a three-dimensional shape of each of the samples to acquire measured three-dimensional shape data which is a result of the measurement;
   a temporary-center-hole position setting device configured to, based on the measured three-dimensional shape data, set positions of temporary center holes for each of the samples;
   an imbalance amount calculation device configured to, based on the measured three-dimensional shape data about each of the samples and design three-dimensional shape data about a pre-set design final shape of the forged rotary body, calculate a rotational imbalance amount in a final shape of each of the samples after being subjected to simulation of given machining on the basis of the temporary center holes;
   a determination device configured to determine whether or not the rotational imbalance amount in each of the samples falls within a pre-set allowable range;
   an average value calculation device configured to, for any one of the forging lots in which the rotational imbalance amounts in all of the samples are determined to be within the allowable range, calculate an average value of the rotational imbalance amounts in all of the samples of the forging lot;
   a center hole machining position setting device configured to calculate center-hole positions which allow the average value of the rotational imbalance amounts to become zero, and set the calculated center-hole positions as center hole machining positions for all of the forged rotary bodies included in the forging lot to which the samples used in the calculation belong; and
   a center hole machining device configured to, during machining of a certain forged rotary body, machining center holes in the certain forged rotary body at the center hole machining positions set for one of the forging lots to which the certain forged rotary body belongs.

6. The system as defined in claim 5, which further comprises a storage device configured to store therein the center hole machining positions set by the center hole machining position setting device, in association with identification information of each of the forging lots, wherein the center hole machining device is operable, based on the identification information of the forging lot to which the certain forged rotary body belongs, to read the center hole machining positions for the certain forged rotary body from the storage device.

7. The system as defined in claim 5 wherein each of the forged rotary bodies is a crankshaft of an engine.

* * * * *